(12) United States Patent
Bulatow

(10) Patent No.: US 9,979,256 B2
(45) Date of Patent: May 22, 2018

(54) ROTARY ELECTRIC MACHINE

(71) Applicant: Continental Automotive GmbH, Hannover (DE)

(72) Inventor: Michael Bulatow, Berlin (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 394 days.

(21) Appl. No.: 14/379,381

(22) PCT Filed: Feb. 26, 2013

(86) PCT No.: PCT/EP2013/053819
§ 371 (c)(1),
(2) Date: Aug. 18, 2014

(87) PCT Pub. No.: WO2013/127793
PCT Pub. Date: Sep. 6, 2013

(65) Prior Publication Data
US 2015/0108870 A1 Apr. 23, 2015

(30) Foreign Application Priority Data

Feb. 28, 2012 (DE) .................. 20 2012 002 024 U

(51) Int. Cl.
*H02K 7/00* (2006.01)
*H02K 7/04* (2006.01)
*H02K 3/51* (2006.01)
*H02K 15/16* (2006.01)

(52) U.S. Cl.
CPC ............... *H02K 7/04* (2013.01); *H02K 3/51* (2013.01); *H02K 15/165* (2013.01)

(58) Field of Classification Search
CPC .. H02K 7/00; H02K 1/27; H02K 7/04; H02K 1/28; H02K 5/04; H02K 5/16
See application file for complete search history.

(56) References Cited

U.S. PATENT DOCUMENTS

| | | | |
|---|---|---|---|
| 3,311,511 A | 3/1967 | Goller | 148/597 |
| 3,558,950 A | 1/1971 | Raybould et al. | 310/270 |
| 4,933,583 A * | 6/1990 | Ripplinger | H02K 1/278 310/156.22 |

(Continued)

FOREIGN PATENT DOCUMENTS

| | | | |
|---|---|---|---|
| DE | 1688665 U | 12/1954 | |
| DE | 3808311 A1 | 9/1989 | ............... H02K 1/27 |

(Continued)

OTHER PUBLICATIONS

International Search Report and Written Opinion, Application No. PCT/EP2013/053819, 11 pages, Jun. 3, 2013.

*Primary Examiner* — Joshua Benitez Rosario
*Assistant Examiner* — Leda Pham
(74) *Attorney, Agent, or Firm* — Slayden Grubert Beard PLLC

(57) ABSTRACT

A rotary electric machine may include a rotor that includes a laminated core arranged on a rotor shaft, wherein the rotor has at least one end-winding cover that encloses the laminated core in the axial direction of the rotor shaft, the end-winding cover has at least one inner face facing the laminated core, and a balancing ring is concentrically arranged around the rotor shaft on the inner face of the end-winding cover.

18 Claims, 2 Drawing Sheets

(56) References Cited

U.S. PATENT DOCUMENTS

| | | | | |
|---|---|---|---|---|
| 5,122,696 A | 6/1992 | Shih et al. | | 310/71 |
| 7,504,756 B2 * | 3/2009 | Caprio | | H02K 17/165 |
| | | | | 310/211 |
| 7,687,968 B2 * | 3/2010 | Waddell | | H02K 1/24 |
| | | | | 310/216.113 |
| 8,276,255 B2 * | 10/2012 | Leachman | | H02K 7/04 |
| | | | | 29/596 |
| 2009/0033160 A1 * | 2/2009 | Mueller | | B60K 6/26 |
| | | | | 310/58 |

FOREIGN PATENT DOCUMENTS

| | | | | |
|---|---|---|---|---|
| DE | 102008043636 A1 | 5/2010 | ............. | H02K 15/16 |
| EP | 2113988 A1 | 11/2009 | ............. | H02K 15/16 |
| JP | 59103551 A | 6/1984 | ............. | H02K 15/16 |
| WO | 2013/127793 A1 | 9/2013 | ............. | H02K 15/16 |

* cited by examiner

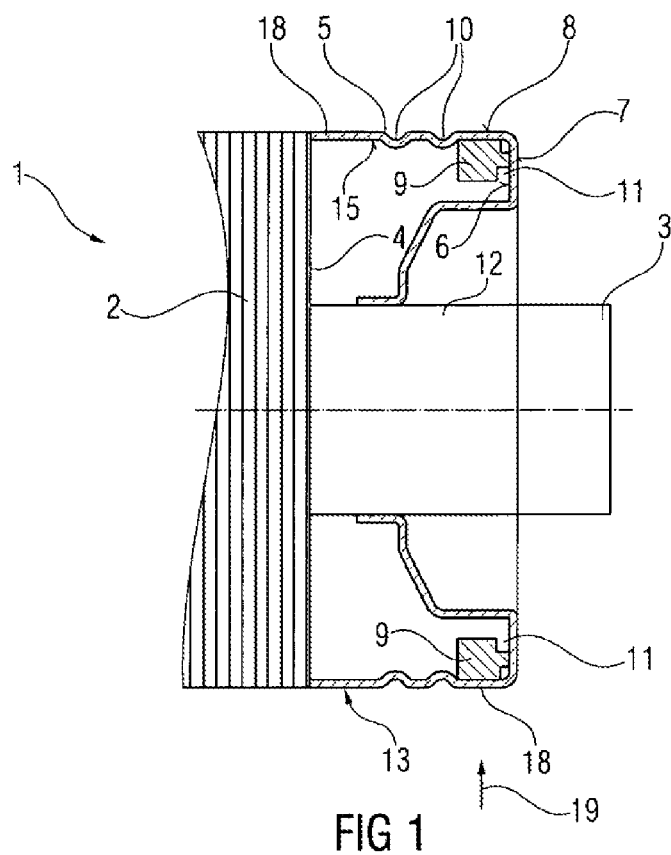
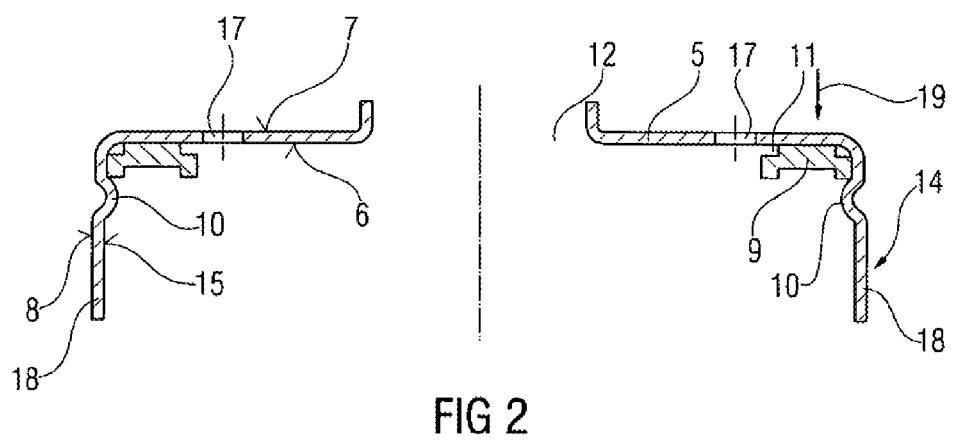
FIG 1
FIG 2

ROTARY ELECTRIC MACHINE

CROSS-REFERENCE TO RELATED APPLICATIONS

This application is a U.S. National Stage Application of International Application No. PCT/EP2013/053819 filed Feb. 26, 2013, which designates the United States of America, and claims priority to DE Application No. 20 2012 002 024.2 filed Feb. 28, 2012, the contents of which are hereby incorporated by reference in their entirety.

TECHNICAL FIELD

The present invention relates to a rotating electrical machine, in particular to an electric motor or a generator. A method for producing a rotating electrical machine is also disclosed.

BACKGROUND

Electric motors are increasingly installed in modern motor vehicles. In this case, said electric motors are used, in particular, as drive motors which are fully integrated in the drive train or are used in hybrid applications, for example also as starter generators. In this case, externally excited synchronous machines which have a rotor comprising a laminated core which is provided with a field winding are sometimes used.

In rotors with laminated cores of this kind, unbalance compensation is typically performed after production either by a local reduction of mass or by an addition of mass.

DE 10 2008 043 636 A1 discloses a method for unbalance compensation on rotors, in which method at least one compensation weight is attached to a pot wall of the rotor.

However, the addition of weights is often associated with more expenditure than the removal of weights and in many cases is not possible with the required accuracy. In addition, an easily weldable material is required for the method of DE 10 2008 043 636 A1.

SUMMARY

One embodiment provides a rotating electrical machine which comprises a rotor having a laminated rotor core which is arranged on a rotor shaft; wherein the rotor has at least one end winding cover which terminates the laminated rotor core in the axial direction of the rotor shaft; the end winding cover has at least one inner face which faces the laminated rotor core; and a balancing ring is arranged concentrically around the rotor shaft on the inner face of the end winding cover.

In a further embodiment, an end winding cover is provided at a first and at a second end of the rotor, a balancing ring being arranged concentrically around the rotor shaft on the inner face of said end winding covers.

In a further embodiment, the balancing ring is attached to the inner face of the end winding cover by means of a rolling undulation which is made in a side wall of the end winding cover and which firmly clamps the balancing ring against the inner face.

In a further embodiment, a plurality of rolling undulations are provided in the side wall of the end winding cover.

In a further embodiment, the balancing ring has an undercut in the axial direction of the rotor shaft for the purpose of fixing the end winding cover.

In a further embodiment, the balancing ring comprises an alloy, wherein the alloy contains iron, chromium and nickel, wherein chromium is contained in the alloy in a percentage by weight of between 18 and 19, and nickel is contained in the alloy in a percentage by weight of between 12 and 13.

In a further embodiment, the balancing ring comprises an alloy composition $Fe_{remainder}Cr_aNi_bMn_cC_dSi_eP_fS_gN_h$, where a, b, c, d, e, f, g and h are indicated in a percentage by weight and $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.

In a further embodiment, the end winding cover comprises an alloy, wherein the alloy contains iron, chromium and nickel, wherein chromium is contained in the alloy in a percentage by weight of between 18 and 19, and nickel is contained in the alloy in a percentage by weight of between 12 and 13.

In a further embodiment, the end winding cover comprises an alloy composition $Fe_{remainder}Cr_aNi_bMn_cC_dSi_eP_fS_gN_h$, where a, b, c, d, e, f, g and h are indicated in a percentage by weight and $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.

In a further embodiment, the end winding cover is produced in a deep-drawing process.

BRIEF DESCRIPTION OF THE DRAWINGS

Example embodiments are explained in greater detail below with reference to the drawings, in which:

FIG. 1 schematically shows a simplified longitudinal section through a first region of a rotor of a rotating electrical machine according to one embodiment;

FIG. 2 schematically shows a simplified longitudinal section through a second region of the rotor according to FIG. 1, and FIG. 3 schematically shows a simplified longitudinal section through the rotor according to one embodiment.

DETAILED DESCRIPTION

Figure 3:
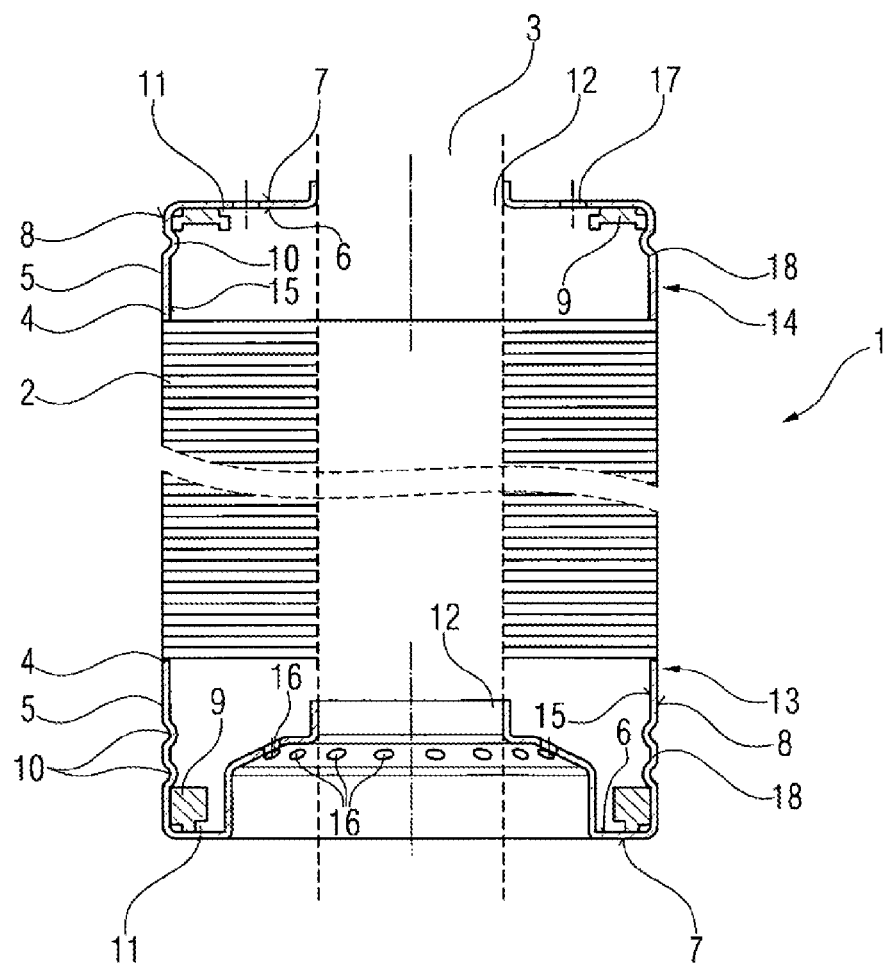

Some embodiments provide a rotating electrical machine which is of as simple construction as possible and at the same time is robust and in which unbalance compensation can be carried out in a particularly simple manner.

An economical method for producing a rotating electrical machine of this kind is also intended to be specified.

Some embodiments provide a rotating electrical machine that comprises the following:
- a rotor having a laminated rotor core which is arranged on a rotor shaft;
- the rotor has at least one end winding cover which terminates the laminated rotor core in the axial direction of the rotor shaft, wherein the end winding cover has at least one inner face which faces the laminated rotor core;
- a balancing ring is arranged concentrically around the rotor shaft on the inner face of the end winding cover.

In this rotating electrical machine, the end winding cover which is present in any case is used to accommodate a balancing ring. The balancing ring which concentrically surrounds the rotor shaft has the advantage that it allows unbalance compensation in a simple manner both in the axial direction and also in the radial direction by removing and possibly also by adding material. The balancing ring can be attached on the inner face of the end winding cover.

In one embodiment, an end winding cover is provided both at a first and also at a second end of the rotor, a balancing ring being arranged concentrically around the rotor shaft on the inner face of said end winding covers.

In this embodiment, the two ends of the rotor are understood to mean the end faces through which the rotor shaft passes. In the assembled state, a fixed bearing can be provided for the rotor shaft in the region of one end and a floating bearing can be provided for the rotor shaft in the region of the other end, depending on which bearing concept is selected for the rotor.

In this embodiment, balancing rings are provided at both ends in order to allow particularly accurate unbalance compensation.

In one embodiment, the balancing ring is attached to the inner face of the end winding cover by means of a rolling undulation which is made in a side wall of the end winding cover and which firmly clamps the balancing ring.

In this embodiment, the balancing ring, which is combined with the end winding cover in a rolling process, is axially and radially fixed by the rolling undulation. The rolling undulation presses the balancing ring against the inner face of the end winding cover, in particular in the axial direction. At the same time, said rolling undulation forms an undercut in the axial direction of the rotor shaft, said undercut being filled with potting compound after a potting process and the end winding cover being fixed in the axial direction in this way.

At the same time, the rolling undulation lends the end winding cover greater strength. In one embodiment, a plurality of rolling undulations are provided in the side wall of the end winding cover in order to achieve an even greater strength.

In one embodiment, the balancing ring has at least one undercut, possibly even a plurality of undercuts, in the axial direction. Undercuts of this kind can be formed, in particular, by the balancing ring being designed to be narrower in regions in the axial direction, that is to say parallel to the direction of the rotor shaft. Undercuts of this kind can be filled with potting compound during a potting process and axially fix the end winding cover once cured.

In one embodiment, the balancing ring comprises an alloy, wherein the alloy contains iron, chromium and nickel, wherein chromium is contained in the alloy in a percentage by weight of between 18 and 19 (that is to say 18% to 19%), and nickel is contained in the alloy in a percentage by weight of between 12 and 13 (that is to say 12% to 13%).

The balancing ring preferably comprises a material which substantially comprises an alloy composition $Fe_{remainder}Cr_aNi_bMn_cC_dSi_eP_fS_gN_h$, that is to say an alloy composition containing:
- chromium Cr in a percentage by weight a of between 18 and 19,
- nickel Ni in a percentage by weight b of between 12 and 13,
- manganese Mn in a percentage by weight c of between 0 and 1.4,
- carbon C in a percentage by weight d of between 0 and 0.055,
- silicon Si in a percentage by weight e of between 0 and 0.6,
- phosphorus P in a percentage by weight f of between 0 and 0.04,
- sulfur S in a percentage by weight g of between 0 and 0.008,
- nitrogen N in a percentage by weight h of between 0 and 0.1,
- iron Fe in a remaining percentage by weight remainder, wherein, preferably and ideally:

remainder=100−a−b−c−d−e−f−g−h. In addition, the material may be contaminated with other substances which are typical during manufacture.

In comparison to known stainless steels, for example steels 1.4301 or 1.4303 according to European Standard EN 10020, said material comprises a particularly high proportion of chromium and nickel. It has been found that workpieces comprising said steel also remain non-magnetizable after shaping, punching or cutting. Eddy current losses are therefore reduced. Said steel is therefore particularly suitable for the end winding cover on account of its strength and its ability to not be magnetized.

In one embodiment, the end winding cover comprises an alloy, wherein the alloy contains iron, chromium and nickel, wherein chromium is contained in the alloy in a percentage by weight of between 18 and 19 (that is to say 18% to 19%), and nickel is contained in the alloy in a percentage by weight of between 12 and 13 (that is to say 12% to 13%).

The end winding cover preferably comprises a material which substantially comprises the same alloy composition $Fe_{remainder}Cr_aNi_bMn_cC_dSi_eP_fS_gN_h$ as in the balancing ring, wherein a, b, c, d, e, f, g and h are likewise indicated in a percentage by weight and $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$. In addition, the material may be contaminated with other substances which are typical during manufacture.

Said steel is particularly suitable for the end winding cover on account of its strength and its ability to not be magnetized.

In one embodiment, hollow spaces in the interior of the rotor are potted with a potting compound. The potting compound used can be known electrically insulating, curable casting resins, for example epoxy resins. Potting the interior has the advantage that all of the components of the rotor are reliably fixed. This is advantageous particularly for high-speed rotors in which the field windings can otherwise be drawn out of the slots owing to the centrifugal forces which are produced during operation.

An impregnation compound can also be used instead of a potting compound. It is also feasible to pot the rotor with a plastic, for example with a polyamide.

In the case of a potted rotor, it is advantageous to select the fit between the end winding cover and the balancing ring in such a way that no potting compound can enter between them. This has the advantage that, in the event of spot-drilling of the end winding cover and of the balancing ring in order to remove mass during unbalance compensation, the drill must not penetrate the potting compound which may blunt said drill.

The balancing ring can be produced, in particular, by turning and then insert-annealed depending on the material used. However, said balancing ring can also be produced in a shaping process, for example by stamping or deep-drawing. These methods are particularly economical and advantageous at least for relatively thin balancing rings.

A rotating electrical machine of this kind is also suitable for high rotation speeds of 10 000 revolutions per minute and more.

In one embodiment, the end winding cover is produced in a deep-drawing process.

In one embodiment, the rotating electrical machine is in the form of an electric motor. Said electrical machine can also be in the form of a generator or can be operated both as a motor and also as a generator.

Electric motors of this kind are suitable for use in a motor vehicle. Said electric motors can be used both as drive motors which are fully integrated in the drive train, for example as wheel hub or axle motors, and also, for example, as starter generators. According to one embodiment, a motor vehicle which comprises the described electric motor is therefore specified. In this case, the motor vehicle can be in the form of an electric or hybrid vehicle.

A method for producing a rotating electrical machine is also specified, wherein the method comprises the following:
  providing a laminated rotor core of a rotor with a field winding and at least one end winding cover which terminates the rotor in the axial direction, wherein a balancing ring is arranged on an inner face of the end winding cover;
  balancing by removing material from the balancing ring.

In this case, material can be removed, for example, by being drilled out or milled. Other balancing methods can also be used. The assembled rotor can be both radially and also axially balanced depending on the selected manufacturing process and the geometry of the end winding covers.

In one embodiment of the method, provision is made for an interior of the rotor to be potted with a potting compound. In this case, the rotor is positioned for the potting process in such a way that openings, which are provided in the end winding cover, for example for discharging potting compound, are located at the highest point, and further openings, which are provided in the end winding cover, for introducing the potting compound are located at a point between the highest and the lowest point.

In this embodiment, one set of openings can be located, in particular, in an end winding cover, which is arranged at the second end of the rotor, and can be used for applying a negative pressure, while the further openings are located in a further end winding cover which is arranged at the first end of the rotor and are used for introducing the potting compound.

In this embodiment, the potting compound fills all of the hollow spaces during potting operation on account of its inherent weight. During potting, a negative pressure can additionally be applied in order to assist the process of filling even hollow spaces which are difficult to access, and to prevent air inclusions being formed.

FIG. 1 shows a simplified longitudinal section through a rotor 1 of a rotating electrical machine in the region of its first end 13. The stator is not shown.

The rotating electrical machine is in the form of an externally excited synchronous machine in this embodiment. The rotor 1 of said electrical machine has a laminated rotor core 2 with a field winding, not shown. The field winding is accommodated in slots, not shown, of the laminated rotor core 2; the rest of the slot interior can be potted with a potting compound.

An end winding cover 5 which is produced in a deep-drawing process is provided in the region of the end windings 4. Said end winding cover surrounds the first end of the laminated rotor core and the field winding and has a central opening 12 for the rotor shaft 3 to pass through. The rotor shaft 3 is connected to the laminated rotor core 2 and to the end winding cover 5 in a rotationally fixed manner and is rotatably mounted on housing parts, not shown, of the electrical machine.

The end winding cover 5 terminates the laminated rotor core 2 in the axial direction. Said end winding cover has an inner face, which faces the laminated rotor core 2, with an inner end face 6 and an inner side surface 15 and also has an outer face, which is averted from the laminated rotor core 2, with an outer end face 7 and an outer side surface 8.

A balancing ring 9 is arranged on the inner face of the end winding cover 5. The balancing ring 9 concentrically surrounds the rotor shaft 3 and, in the embodiment shown, bears against the inner end face 6 and against the inner side surface 15. The balancing ring 9 is shaped in such a way that an undercut 11 is formed in a region on the inner end face 6. Potting compound enters the region of the undercut 11 during the potting process and fixes the end winding cover 5 in the axial direction.

The balancing ring 9 is fixed in the axial and radial direction by means of a rolling undulation 10 which is made in the side wall 18 in such a way that it firmly clamps the balancing ring 9. A yet further rolling undulation 10 is provided behind said one rolling undulation and additionally strengthens the side wall 18.

In this embodiment, material is removed from the balancing ring 9 in the radial direction, that is to say in the direction perpendicular to the longitudinal axis of the rotor shaft 3, during unbalance compensation. This balancing direction is identified by arrow 19.

The end winding cover 5 and the balancing ring 9 comprise a non-magnetizable steel having an alloy composition $Fe_{remainder}Cr_aNi_bMn_cC_dSi_eP_fS_gN_h$ wherein a, b, c, d, e, f, g and h are likewise indicated in a percentage by weight and $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.

However, it is also feasible to use other austenitic steels for the end winding cover, for example steel 1.4301.

FIG. 2 schematically shows a simplified longitudinal section through the rotor 1 according to FIG. 1 in the region of its second end 14. A balancing ring 9 which is clamped against the inner end face 6 by means of a rolling undulation 10 is also provided on this end winding cover 5. The balancing ring 9 is shaped in such a way that it forms an undercut 11, which is filled with potting compound, for the purpose of fixing the end winding cover 5.

In this case, material is removed from the balancing ring 9 in the axial direction, that is to say in the direction parallel to the longitudinal axis of the rotor shaft 3, during unbalance compensation. This balancing direction is identified by arrow 19.

FIG. 3 schematically shows a simplified longitudinal section through a rotor 1, both the first end 13 and also the second end 14 being illustrated in said figure.

This illustration shows first openings 16 for potting compound in the region of the first end 13, and second openings 17 for potting compound in the region of the second end 14. During potting, potting compound enters the interior of the rotor 1 under pressure and fills the existing hollow spaces.

Since the openings 16, 17 are located at a different level to the balancing rings 9, it has proven advantageous to position the rotor 1 during the potting process such that the second openings 17 are located at the highest point. The potting compound then enters through the first openings 16, while a negative pressure is applied to the second openings 17. During this procedure, the potting compound fills the hollow spaces below the first openings 16 on account of its inherent weight and is additionally drawn upward owing to the negative pressure, in order to fill the hollow spaces present there.

Although at least one exemplary embodiment has been described in the above description, various changes and modifications can be made. Said embodiments are merely examples and are not intended to restrict the scope of validity, the applicability or the configuration in any way. Rather, the above description provides a person skilled in the art with a plan for implementing at least one exemplary embodiment, wherein numerous changes in the function and the arrangement of elements which are described in an exemplary embodiment can be made, without departing from the scope of protection of the attached claims and their legal equivalents.

Other embodiments provide a method for producing a rotating electrical machine, wherein the method comprises the following:
providing a laminated rotor core 2 of a rotor 1 with a field winding and at least one end winding cover 5 which terminates the rotor 1 in the axial direction, wherein a balancing ring 9 is arranged on an inner face 6, 15 of the end winding cover 5;
balancing by removing material from the balancing ring 9.

In this case, an interior space in the rotor 1 is preferably potted with a potting compound, wherein the rotor 1 is positioned for the potting process in such a way that openings 17, which are provided in the end winding cover 5, are located at the highest point, and further openings 16, which are provided in the end winding cover 5, for introducing the potting compound are located at a point between the highest and the lowest point.

LIST OF REFERENCE SYMBOLS

1 Rotor
2 Laminated rotor core
3 Rotor shaft
4 End winding
5 End winding cover
6 Inner end face
7 Outer end face
8 Outer side surface
9 Balancing ring
10 Rolling undulation
11 Undercut
12 Central opening
13 First end
14 Second end
15 Inner side surface
16 First openings
17 Second openings
18 Side wall
19 Arrow

What is claimed is:
1. A rotating electrical machine comprising:
a rotor having a laminated rotor core arranged on a rotor shaft;
at least one end winding cover that terminates the laminated rotor core in an axial direction of the rotor shaft;
wherein the end winding cover comprises at least one inner face that faces the laminated rotor core in the axial direction of the rotor shaft; and
a balancing ring arranged concentrically along an inside of a perimeter of the at least one inner face of the end winding cover and remote from both the rotor shaft and the rotor core;
wherein the balancing ring is attached to the at least one inner face of the end winding cover by a rolling undulation formed in a side wall of the end winding cover and which firmly clamps the balancing ring against the inner face.
2. The rotating electrical machine of claim 1, further comprising an end winding cover at each of a first end and a second end of the rotor, and a balancing ring arranged concentrically around the rotor shaft on the inner face of each of the end winding covers.

3. The rotating electrical machine of claim 1, comprising a plurality of rolling undulations in the side wall of the end winding cover.
4. The rotating electrical machine of claim 1, wherein the balancing ring has an undercut in the axial direction of the rotor shaft configured for engagement with the end winding cover.
5. The rotating electrical machine of claim 1, wherein the balancing ring comprises an alloy that contains iron, chromium, and nickel, wherein chromium is contained in the alloy in a percentage by weight of between 18 and 19, and nickel is contained in the alloy in a percentage by weight of between 12 and 13.
6. The rotating electrical machine of claim 5, wherein the balancing ring comprises an alloy composition $Fe_{remainder}Cr_aNi_bMn_cC_dSi_eP_fS_gN_h$, where each of the subscripts a, b, c, d, e, f, g and h indicates a percentage by weight, wherein $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.
7. The rotating electrical machine of claim 1, wherein the end winding cover comprises an alloy that contains iron, chromium and nickel, wherein chromium is contained in the alloy in a percentage by weight of between 18 and 19, and nickel is contained in the alloy in a percentage by weight of between 12 and 13.
8. The rotating electrical machine of claim 7, wherein the end winding cover comprises an alloy composition $Fe_{remainder}Cr_aNi_bMn_cC_dSi_eP_fS_gN_h$, where each of the subscripts a, b, c, d, e, f, g and h indicates a percentage by weight, wherein $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.
9. The rotating electrical machine of claim 1, wherein the end winding cover is produced in a deep-drawing process.
10. A motor vehicle, comprising:
a drive train including an electric motor comprising:
a rotor having a laminated rotor core arranged on a rotor shaft;
at least one end winding cover that terminates the laminated rotor core in an axial direction of the rotor shaft;
wherein the end winding cover comprises at least one inner face that faces the laminated rotor core in the axial direction of the rotor shaft; and
a balancing ring arranged concentrically along an inside of a perimeter of the at least one inner face of the end winding cover and remote from both the rotor shaft and the rotor core;
wherein the balancing ring is attached to the at least one inner face of the end winding cover by a rolling undulation formed in a side wall of the end winding cover and which firmly clamps the balancing ring against the inner face.
11. The motor vehicle of claim 10, comprising an end winding cover at each of a first end and a second end of the rotor, and a balancing ring arranged concentrically around the rotor shaft on the at least one inner face of each of the end winding covers.
12. The rotating electrical machine of claim 10, comprising a plurality of rolling undulations in the side wall of the end winding cover.
13. The motor vehicle of claim 10, wherein the balancing ring has an undercut in the axial direction of the rotor shaft configured for engagement with the end winding cover.
14. The motor vehicle of claim 10, wherein the balancing ring comprises an alloy that contains iron, chromium, and nickel, wherein chromium is contained in the alloy in a percentage by weight of between 18 and 19, and nickel is contained in the alloy in a percentage by weight of between 12 and 13.

15. The motor vehicle of claim 14, wherein the balancing ring comprises an alloy composition $Fe_{remainder}Cr_aNi_bMn_cC_dSi_eP_fS_gN_h$, where each of the subscripts a, b, c, d, e, f, g and h indicates a percentage by weight, wherein $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.

16. The motor vehicle of claim 10, wherein the end winding cover comprises an alloy that contains iron, chromium and nickel, wherein chromium is contained in the alloy in a percentage by weight of between 18 and 19, and nickel is contained in the alloy in a percentage by weight of between 12 and 13.

17. The motor vehicle of claim 16, wherein the end winding cover comprises an alloy composition $Fe_{remainder}Cr_aNi_bMn_cC_dSi_eP_fS_gN_h$, where each of the subscripts a, b, c, d, e, f, g and h indicates a percentage by weight, wherein $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.

18. The motor vehicle of claim 10, wherein the motor vehicle comprises an electric or hybrid vehicle.

\* \* \* \* \*